J. STORY.
Connecting Parts of Glass or Chinaware Utensils.
No. 224,120.  Patented Feb. 3, 1880.
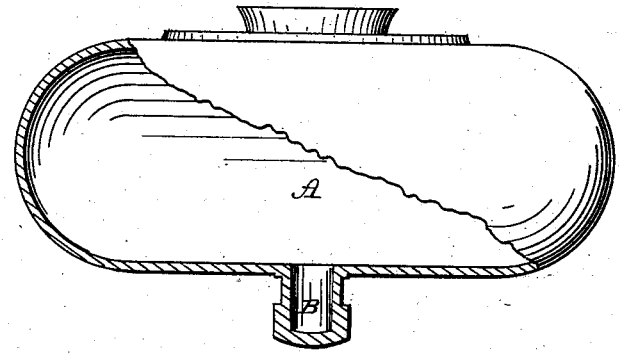
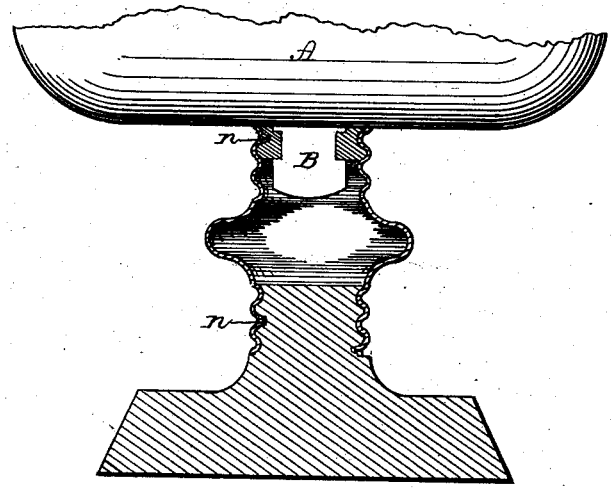
Witnesses:
J. W. Garner
Otto Stein
Inventor:
Jno. Story
per
F. A. Lehmann,
Atty.

United States Patent Office.

JOHN STORY, OF BALDWIN TOWNSHIP, ALLEGHENY COUNTY, PA.

CONNECTING PARTS OF GLASS OR CHINA WARE UTENSILS.

SPECIFICATION forming part of Letters Patent No. 224,120, dated February 3, 1880.

Application filed November 25, 1879.

*To all whom it may concern:*

Be it known that I, JOHN STORY, of Baldwin township, in the county of Allegheny and State of Pennsylvania, have invented certain new and useful Improvements in Connecting Parts of Glass or China Ware Utensils; and I do hereby declare the following to be a full, clear, and exact description of the invention, such as will enable others skilled in the art to which it pertains to make and use it, reference being had to the accompanying drawings, which form part of this specification.

My invention relates to an improvement in the manner of connecting parts of glass or china utensils, and it is an improvement on my invention for which a patent was granted me by the United States, bearing date September 9, 1879, No. 219,418.

It consists in blowing the projection or peg around which the bush of soft metal is placed in one piece with the vessel or utensil from which it protrudes, instead of attaching a solid peg to the outside of it. The peg or projection thus being made hollow cannot be broken or knocked off without also breaking the vessel of which it forms a part, while a solid peg attached to the outside of the utensil is easily broken off or detached therefrom.

Figure 1 is a view of the lamp-bowl alone, partly in section. Fig. 2 shows the bowl secured to its stand.

A represents the bowl of a glass lamp, at the bottom of which is, for the attachment of a soft-metal bush, a hollow projection or peg, B, blown simultaneously with the bowl. This projection may be closed or opened at its lower end, and when open it is to be closed by a stopper. The outside of the projection is made T-shaped, and around it is placed the bush of soft metal, as described in the aforesaid patent.

My object in blowing the projection or peg B, which forms the point of attachment for another part of the utensil in one piece with the bowl, is to give greater strength than if it were attached to the outside of the bowl by a secondary process, which has to be resorted to if the projection be made solid.

The process of attaching a solid projection or peg of glass to a similar body of less density, such as the bowl of a lamp, is objectionable, because it may readily be broken off, which, when blown in the bowl, cannot happen without destroying or breaking the bowl. It is also objectionable because the contraction of two heated bodies differing in density differs in proportion to their density, and frequently the thinner of the two, cooling more rapidly, is rent or cracked.

To prevent the turning back of the mother-screw surrounding the bush, indentations $n$ are made from the outside into the mother-screw and the soft-metal bush within by means of a punch or other instrument. In this simple manner the accidental loosening by unscrewing of the foot of a lamp from the bowl is effectually prevented.

Having thus described my invention, I claim—

The combination of the bowl A, having the peg B blown as a hollow part thereof, with the soft metallic bush and screw, the screw being prevented from being turned backward by being dented into the bush, substantially as shown.

In testimony that I claim the foregoing I have hereunto set my hand this 4th day of November, 1879.

JOHN STORY.

Witnesses:
DAVID McCLARY,
T. F. LEHMANN.